US011384266B2

(12) United States Patent
Salnikov et al.

(10) Patent No.: US 11,384,266 B2
(45) Date of Patent: Jul. 12, 2022

(54) SURFACING AND/OR JOINING METHOD

(71) Applicant: 3M INNOVATIVE PROPERTIES COMPANY, St. Paul, MN (US)

(72) Inventors: Dmitriy Salnikov, Woodbury, MN (US); Clayton A. George, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 713 days.

(21) Appl. No.: 14/875,133

(22) Filed: Oct. 5, 2015

(65) Prior Publication Data
US 2016/0024356 A1    Jan. 28, 2016

Related U.S. Application Data

(60) Continuation of application No. 12/611,374, filed on Nov. 3, 2009, now abandoned, which is a division of application No. 11/059,834, filed on Feb. 17, 2005, now abandoned.

(51) Int. Cl.
| | | |
|---|---|---|
| *C09J 163/00* | (2006.01) | |
| *B32B 37/16* | (2006.01) | |
| *B32B 37/12* | (2006.01) | |
| *B32B 38/00* | (2006.01) | |
| *C09J 7/21* | (2018.01) | |
| *C09J 7/35* | (2018.01) | |
| *C08J 7/04* | (2020.01) | |
| *C08J 7/043* | (2020.01) | |
| *C09J 121/00* | (2006.01) | |
| *C09J 133/04* | (2006.01) | |
| *C08L 9/02* | (2006.01) | |
| *C08L 77/10* | (2006.01) | |
| *C08L 81/06* | (2006.01) | |

(52) U.S. Cl.
CPC .............. *C09J 163/00* (2013.01); *B32B 37/12* (2013.01); *B32B 37/16* (2013.01); *C08J 7/043* (2020.01); *C08J 7/0427* (2020.01); *C09J 121/00* (2013.01); *C09J 133/04* (2013.01); *B32B 2037/1253* (2013.01); *B32B 2038/0076* (2013.01); *B32B 2305/076* (2013.01); *B32B 2305/72* (2013.01); *C08L 9/02* (2013.01); *C08L 77/10* (2013.01); *C08L 81/06* (2013.01); *C08L 2666/02* (2013.01); *C08L 2666/04* (2013.01); *C09J 7/21* (2018.01); *C09J 7/35* (2018.01); *Y10T 428/254* (2015.01); *Y10T 428/31504* (2015.04); *Y10T 428/31511* (2015.04); *Y10T 428/31721* (2015.04); *Y10T 428/31786* (2015.04)

(58) Field of Classification Search
CPC ......... B32B 7/12; B32B 15/092; B32B 15/14; B32B 27/38; B32B 2264/0207; B32B 2264/0221; B32B 2264/025; B32B 5/26; B32B 2260/023; B32B 2038/0056; B32B 2038/0076; B32B 37/12; B32B 2037/1253; B32B 2305/076; B29C 73/02–73/10; B29C 70/025; B29C 73/04; B29C 73/14; B29C 35/049; B29C 65/484; B29C 65/5057; C08L 63/00; C08L 63/04; C08L 2205/02; C09J 5/02; C09J 7/21; C09J 7/35; C09J 163/04; C09J 163/00
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnell et al. | |
| 3,562,223 A | 2/1971 | Bargain et al. | |
| 3,627,780 A | 12/1971 | Bonnard et al. | |
| 3,856,883 A | 12/1974 | Dickie et al. | |
| 3,864,426 A | 2/1975 | Salensky | |
| 3,894,112 A * | 7/1975 | Pagel .................... | C08F 279/02 428/107 |
| 4,100,140 A | 7/1978 | Zahir et al. | |
| 4,107,116 A * | 8/1978 | Riew ...................... | C08G 59/40 528/111.3 |

(Continued)

FOREIGN PATENT DOCUMENTS

| | | |
|---|---|---|
| EP | 0 325 058 A1 | 7/1989 |
| EP | 0 351 025 | 1/1990 |

(Continued)

OTHER PUBLICATIONS

Myhre, Moisture Problems in Advanced Composite Structural Repair, 1982, AIAA Meeting Paper, 23rd Structures, Structural Dynamics and Materials Conference, New Orleans LA, pp. 120-131 (also published in Composites, vol. 13, Issue 3, pp. 289-297, available online Jun. 11, 2003.) (Year: 1982).*

(Continued)

*Primary Examiner* — Monique R Jackson
(74) *Attorney, Agent, or Firm* — Carlos M. Téllez Rodriguez; 3M Innovative Properties Company

(57) ABSTRACT

A method for surfacing a polymeric composite article and/or for joining (for example, by bonding or by co-curing) the article and an adherend (for example, a second polymeric composite article) comprises
(a) providing a cured or curable polymeric composite article;
(b) providing a curable composition comprising
 (1) at least one thermosetting resin, and
 (2) at least one preformed, substantially non-functional, particulate modifier comprising at least one elastomer;
and
(c) directly or indirectly applying the composition to at least a portion of at least one surface of the article.

10 Claims, No Drawings

(56) References Cited

U.S. PATENT DOCUMENTS

| | | | |
|---|---|---|---|
| 4,157,360 | A | 6/1979 | Prevorsek et al. |
| 4,468,497 | A | 8/1984 | Street et al. |
| 4,522,958 | A | 6/1985 | Das et al. |
| 4,524,181 | A | 6/1985 | Adam et al. |
| 4,536,438 | A | 8/1985 | Bishop et al. |
| 4,668,736 | A | 5/1987 | Robins et al. |
| 4,684,678 | A | 8/1987 | Schultz et al. |
| 4,690,988 | A * | 9/1987 | Hoffman ............ C08F 299/026 525/502 |
| 4,704,331 | A | 11/1987 | Robins et al. |
| 4,778,851 | A * | 10/1988 | Henton ................ C08F 279/02 525/65 |
| 4,798,761 | A * | 1/1989 | Wykowski ............ C08L 63/00 442/89 |
| 4,824,500 | A * | 4/1989 | White .................... B29C 73/04 156/153 |
| 4,959,405 | A * | 9/1990 | Briggs ................ C08F 255/023 524/300 |
| 5,003,018 | A | 3/1991 | Repecka |
| 5,073,595 | A | 12/1991 | Almer et al. |
| 5,290,857 | A | 3/1994 | Ashida et al. |
| 5,464,902 | A | 11/1995 | Recker |
| 5,686,509 | A | 11/1997 | Nakayama et al. |
| 5,747,615 | A | 5/1998 | Repecka |
| 6,056,846 | A * | 5/2000 | Kuhl ...................... B29C 70/08 156/278 |
| 6,177,189 | B1 | 1/2001 | Rawlings et al. |
| 6,214,460 | B1 | 4/2001 | Bluem et al. |
| 6,432,507 | B1 | 8/2002 | Brick et al. |
| 6,440,257 | B1 | 8/2002 | Zhou et al. |
| 6,475,616 | B1 | 11/2002 | Dietz et al. |
| 6,486,256 | B1 | 11/2002 | Tarbutton et al. |
| 6,506,494 | B2 | 1/2003 | Brandys et al. |
| 6,508,910 | B2 | 1/2003 | Zhou et al. |
| 6,562,884 | B1 | 5/2003 | Tang et al. |
| 6,565,969 | B1 * | 5/2003 | Lamon ...................... C09J 7/10 428/349 |
| 6,624,213 | B2 | 9/2003 | George et al. |
| 6,790,526 | B2 | 9/2004 | Vargo et al. |
| 6,800,157 | B2 | 10/2004 | Tarbuton et al. |
| 7,507,471 | B1 | 3/2009 | Holte |
| 2002/0009581 | A1 | 1/2002 | Kishi et al. |
| 2002/0081921 | A1 | 6/2002 | Vargo et al. |
| 2002/0179240 | A1 | 12/2002 | Clemens et al. |
| 2003/0069331 | A1 | 4/2003 | Teiichi et al. |
| 2003/0144416 | A1 | 7/2003 | Tarbutton et al. |
| 2004/0191523 | A1 * | 9/2004 | Kye ...................... B32B 37/12 428/413 |
| 2017/0145149 | A1 * | 5/2017 | Christiano ............ C08G 77/38 |

FOREIGN PATENT DOCUMENTS

| | | |
|---|---|---|
| EP | 1 174 481 | 1/2001 |
| EP | 1 011 182 | 10/2005 |
| JP | 62-236879 | 10/1987 |
| JP | 07-503266 | 4/1995 |
| JP | 09-316302 | 12/1997 |
| JP | 10-298518 | 11/1998 |
| JP | 11-050032 | 2/1999 |
| WO | WO 93/15124 | 8/1993 |
| WO | WO 99/64235 | 12/1999 |
| WO | WO 00/55234 | 9/2000 |

OTHER PUBLICATIONS

Office Action dated Apr. 30, 2009. from U.S. Appl. No. 11/059,834, filed Feb. 17, 2009.

Advisory Action dated Apr. 10, 2009 from U.S. Appl. No. 11/059,834, filed Feb. 17, 2009.

Final Office Action dated Jan. 27, 2009 from U.S. Appl. No. 11/059,834, filed Feb. 17, 2009.

Aimer et al., "Physical Properties of Aerospace Structural Adhesives Displaying Resistance to Open Time in High Humidity", pp. 924-934, Proceedings National SAMPE Technical Conference, 1980.

Sue et al., "Fracture Behavior of Rubber-Modified High-Performance Epoxies" *Polymer Toughening*, edited by Charles B. Arends, Chapter 5, pp. 131-174 Marcel Dekker, Inc., New York (1996).

Drake, "Toughening Thermoset Resins", Proceedings of the ACS Division of Polymeric Materials: Science and Engineering, vol. 63, pp. 802-805, 1990.

Hayes et al., "Preformed Particle Toughening of Epoxy-Based Film Adhesive Systems: The Effect of Particle Size and Chemistry", Polymer Composites, vol. 23, No. 3, pp. 418-424, 2002.

Morris et al., "Ageing of Structural Film Adhesives-Changes in Chemical and Physical Properties and the Effect on Joint Strength" Organic Coatings and Applied Science Proceedings, vol. 47, pp. 78-83, 1982.

S. J. Shaw, "Rubber Modified Epoxy Resins", *Rubber Toughened Engineering Plastics*, Chapman & Hall, London, Chapter 6, 1994.

J.S. Tira , "Adhesive and Surface Preparation Evaluation for Stainless Steel Used in Electrical Assemblies" pp. 18-22, SAMPE Journal, Jul./Aug. 1987.

P.J. Van Voast, "Effect of Prebond Humidity Exposure of Cured Composite on Fracture Toughness, Morphology and Cure Kinetics", SAMPE Conference, Spring 2002.

Wahab et al., "Diffusion of Moisture in Adhesively Bonded Joints", The Journal of Adhesion, vol. 77, pp. 43-81, 2001.

* cited by examiner

SURFACING AND/OR JOINING METHOD

CROSS REFERENCE TO RELATED APPLICATION

This application is a continuation application of pending prior application Ser. No. 12/611,374, filed Nov. 3, 2009, which is a divisional of U.S. Ser. No. 11/059,834, filed Feb. 17, 2005, abandoned, the disclosure of which is incorporated by reference in its entirety herein.

FIELD

This invention relates to methods for surfacing polymeric composite articles and for joining (for example, by bonding or by co-curing) such articles and various substrates. In another aspect, this invention also relates to surfaced structures and joined structures prepared thereby.

BACKGROUND

Adhesives have been used in many structural applications including use in constructing vehicles, computer cases, buildings, appliances, and the like. For example, structural adhesives have been used in vehicle assembly (for example, automobile and aircraft assembly) to replace or augment conventional joining techniques such as welds, nuts and bolts, and rivets.

Epoxide resins are monomers or pre-polymers that react with curing agents to yield high performance cured resins. The cured resins exhibit numerous desirable chemical and physical characteristics (for example, thermal and chemical resistance, adhesion retention, low shrinkage, abrasion resistance, and high dielectric strength) and are widely utilized (for example, in the construction and electronics industries) as protective coatings for electrical insulation, as composite matrix resins, and as structural adhesives.

Frequently, it is desired that the cured epoxy resins have a relatively high glass transition temperature ($T_g$), so as to be strong at relatively high temperatures. A common method of increasing the glass transition temperature has been by introducing a high degree of crosslinking.

Cured resins having a high crosslink density have had shortcomings, however. For example, such resins have typically been very brittle (that is, not very tough or ductile). Thus, it has often been necessary or desirable to incorporate various resin-insoluble modifiers to reduce brittleness and increase toughness (thereby increasing impact resistance, as well as resistance to failure resulting from vibration and fatigue loading).

In addition to exhibiting brittleness problems, the cured resins have sometimes exhibited undesirable moisture uptake characteristics (especially when a high concentration of polar groups has been utilized), resulting in reduced structural adhesive performance.

SUMMARY

Thus, we recognize that there is a continuing need for higher performance adhesives in order to meet the changing needs of various industries such as, for example, the vehicle assembly industry. In particular, for the joining of polymeric composite parts in the aircraft industry, we recognize that there is a need for joining methods that can provide high performance joints, even in the presence of significant prebond humidity.

Briefly, in one aspect, the present invention provides a method for surfacing a polymeric composite article (for example, to reduce or eliminate surface imperfections and provide a more paintable surface) and/or for joining (for example, by bonding or by co-curing) the article and an adherend (for example, a second polymeric composite article).

The method comprises
  (a) providing a cured or curable polymeric composite article;
  (b) providing a curable composition comprising
    (1) at least one thermosetting resin, and
    (2) at least one preformed, substantially non-functional, particulate modifier comprising at least one elastomer;
  and
  (c) directly or indirectly applying the composition to at least a portion of at least one surface (preferably, a composite surface) of the article.

Preferably, the article is a cured polymeric composite article, the thermosetting resin is an epoxide resin, and/or the modifier is a core-shell polymer modifier. The method preferably further comprises bringing at least a portion of at least one surface of at least one adherend into contact with the composition in a manner such that the composition becomes sandwiched between the article and the adherend, and/or at least partially curing the composition.

It has been discovered that thermosetting compositions comprising certain types of particulate modifiers can be used as surfacing materials and/or to form high performance joints between polymeric composite parts and various adherends (including, for example, other cured or curable polymeric composite parts). Surprisingly, such compositions exhibit an ability to resist the negative effects of prebond humidity (including, for example, the negative effects of the moisture content of the article at the time of surfacing or joining).

Such negative effects can include a reduction in cohesive strength (for example, due to a lowering of glass transition temperature ($T_g$)), a reduction in cure rate, and/or a reduction in toughness (for example, due to morphology changes). Relative to structural adhesives commonly used in the aerospace industry, the compositions can show significantly improved retention of performance characteristics without the need for prebond conditioning (for example, drying).

Thus, at least some embodiments of the method of the invention meet the above-stated need in the art for joining methods that can provide high performance joints, even in the presence of significant prebond humidity. The ability to provide such joints can enable reliable and consistent parts manufacture and can reduce the costly need for restrictive temperature and humidity control of preformed parts (and part assembly areas) in aircraft assembly.

In another aspect, this invention also provides a surfaced or joined structure comprising
  (a) a cured or curable polymeric composite article; and
  (b) a cured or curable composition comprising
    (1) at least one thermosetting resin, and
    (2) at least one preformed, substantially non-functional, particulate modifier comprising at least one elastomer;
the composition being in contact with at least a portion of at least one surface (preferably, a composite surface) of the article. Preferably, the structure is a joined structure that further comprises at least one adherend that is joined to the article by at least one joint comprising the cured composition.

DETAILED DESCRIPTION

Definitions

As used in this application:

"cure" means to effect polymerization and/or to effect crosslinking (as evidenced, for example, by a change in density, viscosity, modulus, color, pH, refractive index, or other physical or chemical property);

"co-cure" (in reference to the joining of a polymeric composite article and an adherend by using a curable composition) means to simultaneously effect at least partial cure of the curable composition and at least partial cure of the article and/or the adherend;

"bond" (in reference to the joining of a polymeric composite article and an adherend by using a curable composition) means to join by a technique other than co-curing;

"cured" means that a sufficient number of the primary polymerizable or crosslinkable functional groups of a thermosetting resin (for example, the epoxide groups of an epoxide resin) have been consumed through chemical reaction to enable the resin to function for its intended purpose;

"preformed" (in reference to a particulate modifier as a component of a curable composition comprising thermosetting resin) means formed prior to initiation of the curing of the thermosetting resin as discrete particles that substantially maintain their discreteness during and after curing; and "substantially non-functional" (in reference to a particulate modifier as a component of a curable composition comprising thermosetting resin) means bearing essentially no functional groups that are capable of both (1) contact and (2) chemical reaction with the thermosetting resin.

Polymeric Composite Article

Polymeric composite articles (also sometimes called composite parts) are known and include articles that comprise reinforcing fibers (for example, carbon or glass) embedded in an organic resin matrix (for example, comprising a thermosetting resin that can be cured to form a glassy network polymer). Polymeric composite articles can be as simple as one or more layers of curable (that is, uncured or partially cured) resin-impregnated fiber or fabric (such single- or multi-layer structures being termed "prepreg"), or they can be as complex as sandwich constructions comprising a metallic or non-metallic honeycomb core and prepreg or cured prepreg. Articles typically used in structural applications include composite stringers, composite skin, and the like, which can be used to construct flaps, alirons, radomes, horizontal or vertical stabilizers, wings, and other portions of aircraft.

Suitable thermosetting resins for use in making composite articles include, for example, epoxide resins, curable imide resins (especially maleimide resins, but also including, for example, commercial K-3 polyimides (available from duPont) and polyimides having a terminal reactive group such as acetylene, diacetylene, phenylethynyl, norbornene, nadimide, or benzocyclobutane), vinyl ester resins and acrylic resins (for example, (meth)acrylic esters or amides of polyols, epoxides, and amines), bisbenzocyclobutane resins, cyanate ester resins, phenolic resins (including nitrile phenolics), and the like, and mixtures thereof. The resins can be utilized in the form of either monomers or prepolymers. Thermoplastic resins (for example, polysulfones, poly(ether-ether-ketone) (PEEK), polyphenylene sulfide, polyamides, polyethersulfone, polyetherimides, polycarbonates, and the like, and mixtures thereof) can also be utilized.

Preferred resins include thermosetting resins (more preferably, epoxide resins, maleimide resins, cyanate ester resins, and the like, and mixtures thereof). Epoxide resins are most preferred due to their processing characteristics, high temperature properties, and environmental resistance.

Suitable reinforcing fibers (preferably, continuous reinforcing fibers) for use in preparing composite articles include both organic and inorganic fibers (for example, carbon or graphite fibers, glass fibers, ceramic fibers, boron fibers, silicon carbide fibers, cellulose fibers, polyimide fibers, polyamide fibers, polyethylene fibers, and the like, and combinations thereof). Fibers of carbon, glass, or polyamide can be preferred due to considerations of cost, physical properties, and processability. Such fibers can be in the form of, for example, a unidirectional array of individual continuous fibers, woven fabric, knitted fabric, yarn, roving, braided constructions, or non-woven mat. Generally, the compositions can contain, for example, from about 30 to about 80 (preferably, from about 45 to about 70) volume percent fibers, depending upon structural application requirements.

Useful fiber-containing resin compositions can further comprise additives such as curing agents, cure accelerators, catalysts, crosslinking agents, dyes, flame retardants, pigments, impact modifiers (for example, rubbers or thermoplastics), flow control agents, and the like, and mixtures thereof.

Composite articles can be made by a variety of conventional processes including, for example, resin transfer molding, filament winding, tow placement, resin infusion processes, and traditional prepreg processes. Prepregs can be prepared by impregnating an array of fibers (or a fabric) with a resin (or with a blend or solution of resin in volatile organic liquid) and then layering the impregnated tape or fabric. The resulting prepreg can then be cured by application of heat, along with the application of pressure or vacuum (or both) to remove any trapped air.

Composite parts can also be made by a resin transfer molding process, which is widely used to prepare composite parts for the aerospace and automotive industries. In this process, fibers can first be shaped into a preform that can then be compressed to final part shape in a metal mold. The resin can then be pumped into the mold and heat-cured. A low resin viscosity can facilitate this process in that such a resin can flow through the compressed preform in a short amount of time, without preform distortion.

A filament winding process is typically used to prepare cylinders or other composites having a circular or oval cross-sectional shape. In this process, a fiber tow or an array of tows can be impregnated with resin by running it through a resin bath (preferably, containing a low viscosity resin) and immediately winding the impregnated tow onto a mandrel. The resulting composite can then be heat-cured.

A pultrusion process (a continuous process used to prepare constant cross-section parts) can also be used to make composites. In such a process, a large array of continuous fibers can first be wetted out in a resin bath (preferably, containing a low viscosity resin). The resulting wet array can then be pulled through a heated die, where trapped air can be squeezed out and the resin cured.

Curable Composition (1) Thermosetting Resin

Resins suitable for use in preparing the curable composition of the method of the invention include thermosetting resins. Such resins can be cured by exposure to heat or radiation to form a glassy network polymer. Suitable resins include, for example, epoxide resins, curable imide resins (especially maleimide resins, but also including, for example, commercial K-3 polyimides (available from duPont) and polyimides having a terminal reactive group such as acetylene, diacetylene, phenylethynyl, norbornene, nadimide, or benzocyclobutane), vinyl ester resins and acrylic resins (for example, (meth)acrylic esters or amides of polyols, epoxides, and amines), bisbenzocyclobutane resins, cyanate ester resins, and the like, and mixtures thereof. The resins can be utilized in the form of either monomers or prepolymers. Preferred resins include epoxide resins, maleimide resins, cyanate ester resins, and the like, and mixtures thereof. Epoxide resins are especially preferred due to their processing characteristics, high temperature properties, and environmental resistance.

Epoxide resins are well-known in the art and comprise compounds or mixtures of compounds that contain one or more epoxide groups of the structure

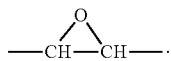

The compounds can be saturated or unsaturated, aliphatic, alicylic, aromatic, or heterocyclic, or can comprise combinations thereof. Compounds that contain more than one epoxide group (that is, polyepoxides) are preferred.

Polyepoxides that can be utilized in the curable composition of the method of the invention include, for example, both aliphatic and aromatic polyepoxides, but aromatic polyepoxides are preferred for high temperature applications. The aromatic polyepoxides are compounds containing at least one aromatic ring structure (for example, a benzene ring) and more than one epoxide group. Preferred aromatic polyepoxides include the polyglycidyl ethers of polyhydric phenols (for example, bisphenol A derivative resins, epoxy cresol-novolac resins, bisphenol F derivative resins, epoxy phenol-novolac resins), glycidyl esters of aromatic carboxylic acids, glycidyl amines of aromatic amines, and the like, and mixtures thereof. The most preferred aromatic polyepoxides are the polyglycidyl ethers of polyhydric phenols.

Representative examples of aliphatic polyepoxides that can be utilized in the curable composition include 3',4'-epoxycyclohexylmethyl-3,4-epoxycyclohexanecarboxylate, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and the like, and mixtures thereof.

Representative examples of aromatic polyepoxides that can be utilized in the curable composition include glycidyl esters of aromatic carboxylic acids (for example, phthalic acid diglycidyl ester, isophthalic acid diglycidyl ester, trimellitic acid triglycidyl ester, pyromellitic acid tetraglycidyl ester, and the like, and mixtures thereof); N-glycidylaminobenzenes (for example, N,N-diglycidylbenzeneamine, bis(N,N-diglycidyl-4-aminophenyl)methane, 1,3-bis(N,N-diglycidylamino)benzene, N,N-diglycidyl-4-glycidyloxybenzeneamine, and the like, and mixtures thereof); the polyglycidyl derivatives of polyhydric phenols (for example, the polyglycidyl ethers of polyhydric phenols such as 2,2-bis-[4-hydroxyphenyl]propane, tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane); polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the *Handbook of Epoxy Resins* by Lee and Neville, McGraw-Hill Book Co., New York (1967) and in *Epoxy Resins, Chemistry and Technology*, Second Edition, edited by C. May, Marcel Dekker, Inc., New York (1988); and the like; and mixtures thereof. A preferred class of polyglycidyl ethers of polyhydric phenols for use in the curable composition are the diglycidyl ethers of bisphenol that have pendant carbocyclic groups (for example, those described in U.S. Pat. No. 3,298,998 (Coover et al.), the description of which is incorporated herein by reference). Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. Preferred compounds include dicyclopentadiene-containing polyepoxides (for example, TACTIX 756 and TACTIX 556, available from Huntsman Advanced Materials Americas, Inc., Brewster, N.Y.).

Suitable epoxide resins can be prepared by, for example, the reaction of epichlorohydrin with a polyol, as described, for example, in U.S. Pat. No. 4,522,958 (Das et al.), the description of which is incorporated herein by reference, as well as by other methods described by Lee and Neville and by May, supra. Many epoxide resins are also commercially available.

Maleimide resins suitable for use in the curable composition of the method of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, for example, by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and the like, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, for example, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenyl-bisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; α-methyl styrene; chlorostyrene; p-phenylstyrene; p-methylstyrene; t-butylstyrene; phenyl vinyl ether; and the like; and mixtures thereof. Of particular interest are resin systems employing a bismaleimide in combination with a bis(alkenylphenol). Descriptions of a typical resin system of this type can be found in U.S. Pat. No. 4,100,140 (Zahir et al.), the descriptions of which are incorporated herein by reference. Particularly preferred components are 4,4'-bismaleimidodiphenylmethane and o,o'-diallyl bisphenol A.

Cyanate ester resins suitable for use in the curable composition of the method of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable cyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S, and the like, and mixtures thereof. Tri- and higher functionality cyanate ester resins are also suitable.

(2) Particulate Modifier

Particulate modifiers that are suitable for use in preparing the curable composition of the method of the invention include preformed, substantially non-functional particulate modifiers that comprise at least one elastomer. Such modifiers preferably comprise both a rubbery phase (for example, having a glass transition temperature ($T_g$) less than or equal to about 0° C. (preferably, less than or equal to about −20° C.)) and a thermoplastic or glassy phase (for example, having a glass transition temperature above about 25° C. (preferably, above about 50° C.)). The rubbery phase can optionally be crosslinked. Although the modifiers are substantially non-functional, a small amount of reactive functionality can be tolerated to the extent that the moisture uptake characteristics of the modifier (as evidenced by, for example, thermogravimetric analysis (TGA)) are not significantly affected.

Useful particulate modifiers can have any of a wide range of particle sizes (as measured prior to addition to the thermosetting resin). For many applications, however, microparticles can be effectively utilized. Preferred particles can have an average diameter of at least about 0.1 micron, 0.2 micron, or 2 microns up to (and including) about 10 microns, 50 microns, 100 microns, 200 microns, or 500 microns (where any lower size limit can be paired with any upper size limit, depending upon the properties desired for a particular application). (As used herein, the term "diameter" refers not only to the diameter of substantially spherical particles but also to the longest dimension of non-spherical particles.) Since the particulate modifiers are preformed, their particle size is predetermined, but some change in size can occur upon addition to the thermosetting resin (for example, due to swelling).

Suitable modifiers include core-shell polymer modifiers having a polymerized rubbery core surrounded by a polymerized thermoplastic or glassy shell, and the like, and mixtures thereof. Useful modifiers of these types are described in *Polymer Toughening*, edited by Charles B. Arends, Chapter 5, pages 131-174, Marcel Dekker, Inc., New York (1996), the descriptions of which are incorporated herein by reference. Useful modifiers can also include elastomeric polymer modifiers that lack the above-described thermoplastic or glassy shell, provided that the modifier is at least somewhat swellable in the selected thermosetting resin while substantially maintaining its discreteness.

Preferred modifiers include core-shell polymer modifiers, and the like, and mixtures thereof. More preferred are core-shell polymer modifiers having a polyacrylate or polymethacrylate (hereinafter, designated jointly as poly(meth)acrylate) shell and a synthetic rubber core (most preferably, a poly(meth)acrylate shell and a core selected from styrene-butadiene rubber, acrylonitrile-butadiene rubber, and combinations thereof, including copolymers).

Useful glassy shells include those that comprise polymerized acrylic acid ester or methacrylic acid ester (preferably, $C_1$-$C_4$ alkyl-substituted methacrylate; more preferably, polymethylmethacrylate or a copolymer of alkyl methacrylate and butyl acrylate); polymerized monovinyl aromatic hydrocarbon; a polymerized mixture of acrylic or methacrylic acid ester and monovinyl aromatic hydrocarbon (for example, a copolymer of methyl methacrylate and styrene); and the like; and combinations thereof.

Useful rubbery cores include those that comprise polyacrylate (for example, poly(butyl acrylate), poly(isooctyl acrylate), or a copolymer of ethyl acrylate and butyl acrylate); polysiloxane (for example, polydimethylsiloxane); polymerized diene (for example, polybutadiene); a polymerized mixture of diene and monovinyl aromatic hydrocarbon (for example, a copolymer of butadiene and styrene); a polymerized mixture of diene and acrylic monomer (for example, a copolymer of butadiene and acrylonitrile); a polymerized mixture of acrylic or methacrylic acid ester and monovinyl aromatic hydrocarbon (for example, a copolymer of butyl acrylate and styrene); and the like; and combinations thereof (for example, copolymers of alkyl methacrylate, butadiene, and styrene).

Useful modifiers include core/shell polymers such as methacrylate-butadiene-styrene (MBS) copolymer wherein the core is crosslinked styrene/butadiene rubber and the shell is polymethylacrylate (for example, ACRYLOID KM653 and KM680, available from Rohm and Haas, Philadelphia, Pa.), those having a core comprising polybutadiene and a shell comprising poly(methyl methacrylate) (for example, KANE ACE M511, M521, B11A, B22, B31, and M901 available from Kaneka Corporation, Houston, Tex. and CLEARSTRENGTH C223 available from ATOFINA, Philadelphia, Pa.), those having a polysiloxane core and a polyacrylate shell (for example, CLEARSTRENGTH S-2001 available from ATOFINA and GENIOPERL P22 available from Wacker-Chemie GmbH, Wacker Silicones, Munich, Germany), those having a polyacrylate core and a poly(methyl methacrylate) shell (for example, PARALOID EXL2330 available from Rohm and Haas and STAPHYLOID AC3355 and AC3395 available from Takeda Chemical Company, Osaka, Japan), those having an MBS core and a poly(methyl methacrylate) shell (for example, PARALOID EXL2691A, EXL2691, and EXL2655 available from Rohm and Haas); and the like; and mixtures thereof. Preferred modifiers include the above-listed ACRYLOID and PARALOID modifiers; and the like; and mixtures thereof (3) Other Components The curable composition can further comprise one or more additives including, for example, soluble thermoplastic additives (for example, to modify viscosity or rheology to ensure a handleable film); curing agents; cure accelerators; catalysts; crosslinking agents; dyes; flame retardants; pigments; flow control agents; reinforcing fillers, fibers, or particles (including silica, calcium carbonate, barium sulfate, glass beads, and the like); electrically or thermally conductive particles; scrim or embedded carrier (for example, woven or nonwoven glass, woven or nonwoven polymeric fabrics such as those of polyamide or polyester, and metal meshes or foils such as those of aluminum or copper); and the like; and mixtures thereof. The additives can be, for example, partially or wholly embedded in the composition or borne on a surface thereof. The composition itself can also be borne on a carrier (for example, a release liner).

Epoxide resins can be cured by a variety of curing agents, some of which are described (along with a method for calculating the amounts to be used) by Lee and Neville in *Handbook of Epoxy Resins*, McGraw-Hill, pages 36-140, New York (1967). Useful epoxide resin curing agents include polyamines such as ethylenediamine, diethylenetriamine, aminoethylethanolamine, and the like, as well as aromatic amines such as diaminodiphenylsulfone, 9,9-bis(4-aminophenyl)fluorene, 9,9-bis(3-chloro-4-(aminophenyl) fluorene, 9,9-bis(3-methyl-4-(aminophenyl)fluorene, and the like; hydrazides such as isophthalic dihydrazide; amides such as dicyandiamide; polycarboxylic acids such as adipic acid; acid anhydrides such as phthalic anhydride and chlorendic anhydride; polyphenols such as bisphenol A; and the like; and mixtures thereof. Generally, the epoxide resin and curing agent are used in stoichiometric amounts, but the curing agent can be used in amounts ranging from about 0.1 to 1.7 times the stoichiometric amount of epoxide resin.

Epoxide resin curing agents also include catalysts (for example, Lewis acids and bases; tertiary amines; thermal cationic catalysts including Brønsted acids; anionic catalysts including imidazoles such as 4,5-diphenylimidazole; complexed Lewis acids; and photocatalysts including organometallic compounds and salts). Thermally-activated catalysts can generally be used in amounts ranging from about 0.05 to about 5 percent by weight, based upon the amount of epoxide resin present in the curable composition.

N,N'-bismaleimide resins can be cured using diamine curing agents, for example, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, for example, co-cure with aromatic olefins (such as bis-allylphenyl ether, 4,4'-bis(o-propenylphenoxy)benzophenone, o,o'-diallyl bisphenol A, and the like) or thermal cure via a self-polymerization mechanism.

Cyanate ester resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of cyanate ester resin.

Preparation of Curable Composition

The curable composition of the method of the invention can be prepared by combining at least one particulate modifier, at least one resin, and any other components (optionally, with stirring or agitation). The resins can be liquid, solid, or a combination thereof, and thus the resulting composition can be, for example, in the form of a paste or a film. Depending upon its particular formulation and viscoelastic characteristics, such a film can be handled with or without the aid of a supporting material (for example, an embedded scrim or release liner).

Preferably, the particulate modifier can be well-dispersed in the resin, so as to be substantially non-agglomerated. Solvent can be used to aid in combination and dispersion, if desired, provided that the chosen solvent is one that cannot react appreciably with the components of the composition and that cannot appreciably dissolve or swell the particulate modifier (especially the elastomer component(s) of the modifier). Suitable solvents include, for example, acetone, heptane, toluene, isopropanol, and the like, and mixtures thereof.

Preferably, little or no solvent is utilized. Solventless compositions can be prepared by simply combining the components with or without the use of mild heating. In a more preferred method of forming the curable composition, the components are combined in a solvent-free process, wherein the resultant mixture is both heated and stirred until a relatively uniform mixture is formed.

The particulate modifier can generally be included in the composition in a concentration of about 2 to about 30 weight percent, based upon the total weight of the composition. Preferably, the modifier is present in a concentration of about 5 to about 20 weight percent, based upon the total weight of the composition.

Preferably, at least one thermally- or photolytically-activatable curing agent is included in the curable composition in order to facilitate low temperature processing. Such curing agents are preferably incorporated into the composition at temperatures lower than the activation temperature of the curing agents. Preferred curing agents include imidazoles, amides (for example, dicyandiamide), aromatic amines, modified ureas, anhydride curing agents, hydrazide curing agents, thermal cationic catalysts, anionic catalysts, photocatalysts, and mixtures thereof. Most preferred are amides, hydrazides, modified ureas, aromatic amines, and mixtures thereof. The further addition of a flow control agent to the curable composition can facilitate the achievement of desired film formation and other rheological characteristics.

In a preferred method, the curable composition can be formed by combining the particulate modifier(s) and the resin(s) at elevated temperatures (for example, temperatures sufficient to melt the resin so as to facilitate its relatively uniform mixing with the modifier) and then cooling the resulting combination to a temperature below the activation or melting temperature of the curing agent(s). The curing agent(s) can then be blended into the combination.

Application of Curable Composition

The curable composition used in the method of the invention can be applied to the composite article (and/or to an adherend, which is a body that is to be adhered to the composite article at their interface) by any of a variety of application methods. Useful application methods include, for example, coating (using roll, spray, brush, or extrusion techniques), lamination, reticulation, vacuum lamination, troweling, and the like, and combinations thereof. Cutting techniques (for example, die cutting, Gerber cutting using a heated cutting element, and laser cutting) can also be employed to provide particular shapes prior to application. At least one of the surfaces to which the composition is applied is a composite surface. Solvent-free application of the composition is preferred and can be accomplished, for example, by transfer lamination of the composition in film form to a desired surface.

In surfacing a composite article, the curable composition can be applied by, for example, transfer lamination followed by vacuum compaction (if the composition is in film form)

or by troweling followed by smoothing (if the composition is in paste form). The surfacing method of the invention can be used to cover surface imperfections (for example, those caused by honeycomb mark-off or fiber weave pattern telegraphing) and to provide a relatively smooth, paintable surface.

In joining the composite article and an adherend, the curable composition can be applied to the article directly, or it can be applied to the article indirectly by, for example, direct application to the adherend to form a composition-bearing adherend, followed by bringing the article and the composition-bearing adherend together in a manner such that the composition is sandwiched between the article and the adherend. Thus, the joining method of the invention can comprise (a) applying an uncured mass of the curable composition (for example, in the form of a film or a paste) to at least one of a polymeric composite article and an adherend; (b) sandwiching the uncured mass of the curable composition between the article and the adherend; and (c) curing the composition to form a joint between the article and the adherend. If desired, such joining method can be carried out by simply inserting the composition (for example, in the form of a film) between the article and the adherend as they are brought together.

Adherends can be chosen from a wide variety of polymeric composite articles, films, sheets, and other surfaces, depending upon the particular joining application. The curable composition can form adhesive bonds between a polymeric composite article and metallic components (for example, iron, aluminum, titanium, magnesium, copper, stainless steel, and the like, and alloys thereof) and between a polymeric composite article and non-metallic substrates (for example, reinforced and unreinforced thermoplastic and thermoset polymers, as well as other organic materials (or organic composite materials) and inorganic materials including glass and ceramics).

Preferably, the adherend comprises a polymeric composite article. More preferably, the adherend comprises a polymeric composite article and the resulting joined structure forms at least a portion of a vehicle (most preferably, a portion of an aircraft).

Preferred adherends also include those that comprise protective articles, paint replacement systems, and/or lightning protection systems. Such adherends can comprise, for example, one or more polymeric composite layers, one or more layers of the curable composition (cured or uncured), one or more layers of metal (for example, metal mesh, which can optionally be embedded in the curable composition prior to cure), and/or one or more protective article, paint replacement applique, and/or lightning protection applique layers. Such lightning protection appliques can comprise, for example, a polymer film (preferably, a fluoropolymer film), a pressure-sensitive adhesive (preferably, an acrylic pressure-sensitive adhesive), and a metal layer that can optionally be embedded in the pressure-sensitive adhesive or bonded directly to the polymer film using any of the methods described in the art. Alternatively, the pressure-sensitive adhesive (of the lightning protection applique, or of a paint replacement applique) can be omitted and optionally replaced with a thermosetting adhesive composition (for example, the curable composition used in the method of the invention). Useful protective articles, paint replacement appliques, and lightning protection systems include those described in U.S. Patent Application Publication No. US 2002/0179240 (Clemens et al.), U.S. Pat. No. 6,475,616 (Dietz et al.), International Patent Application Publication No. WO 99/64235 (Minnesota Mining and Manufacturing Company), U.S. Pat. No. 6,177,189 (Rawlings et al.), U.S. Pat. No. 6,790,526 (Vargo et al.), U.S. Patent Application Publication No. US 2002/0081921 (Vargo et al.), U.S. Pat. No. 4,912,594 (Bannink, Jr. et al.), U.S. Pat. No. 6,432,507 (Brick et al.), and European Patent Application Publication No. EP 1 011 182 (Minnesota Mining and Manufacturing Company), the descriptions of which are incorporated herein by reference.

The method of the invention can comprise one or more surfacing steps, one or more joining steps, the use of one or more polymeric composite articles, and/or the use of one or more adherends.

Curing

The curable composition used in the method of the invention is thermosettable. A "thermosettable" or "thermosetting" composition is one that can be cured (that is, crosslinked) by exposure to, for example, thermal radiation (or heat), actinic radiation, moisture, or other means (preferably, thermal radiation) to yield a substantially infusible (that is, thermoset) material. Combinations of various curing means can also be used (for example, a combination of heat and actinic radiation).

EXAMPLES

Objects and advantages of this invention are further illustrated by the following examples, but the particular materials and amounts thereof recited in these examples, as well as other conditions and details, should not be construed to unduly limit this invention.

Test Methods

Weight Loss by Thermogravimetric Analysis (TGA)

Cured polymeric composite articles were evaluated for moisture content using a Thermogravimetric Analyzer TGA-2950 (available from TA Instruments, New Castle, Del.). The cured article was removed from the conditioning chamber (where applicable) and small pieces were broken off using a pliers to provide samples which were 2 to 3 plies thick and that weighed between 4.968 and 19.209 milligrams. These samples were essentially immediately placed in a small closed vial until tested, between 15 and 30 minutes later. The samples were heated from approximately 25° C. to 200° C. at a rate of 10° C./minute in a nitrogen atmosphere at a flow rate of from 40 to 60 milliliters/minute. Weight loss over this temperature range was calculated using the software provided with the equipment. Results are reported as % weight loss (of moisture).

Overlap Shear Strength (OLS)

Cured joined structures were evaluated for overlap shear strength. More specifically, cured joined structures measuring 7 inches (17.8 centimeters) long were obtained which were then cut in the lengthwise direction into 1 inch (2.54 centimeters) wide (nominal) test strips. Next, one groove was cut in the crosswise direction through the thickness of the cured polymeric composite article on each side of a cured joined structure test strip in an offset manner, so as to form a 0.5 inch (12.7 millimeters) long overlap section at the center of the test strip. This formed a test strip similar to that described in ASTM D 3165-95, which was then positioned in a tensile tester (available from MTS Systems Corporation, Eden Prairie, Minn.) such that the gripping jaws were approximately 5 inches (12.7 centimeters) apart and each jaw gripped approximately 1 inch (2.5 centimeters) of the test strip. A 30,000 pound-force ($lb_f$) (13.3 kiloNewtons) load cell was employed. A grip separation rate of 0.05 inches/minute (1.27 millimeters/minute) was applied until failure occurred. Testing was conducted at one of two different test temperatures (93° C. or 136° C.), as determined by means of a thermocouple attached to the test strip. Samples were equilibrated at temperature for between 10 and 20 minutes prior to testing. For each cured joined structure three test strips were evaluated and used to obtain an average value. The results are reported in pounds/square inch (psi) and in MPa.

Environmental Conditioning

Cured polymeric composite articles were conditioned prior to testing using one of the following methods.
Method 1: Dry
A cured polymeric composite article was dried in an oven at 235° F. (113° C.) for 9 days, then removed and allowed to cool for 1 hour to about 72° F. (22° C.) after which it was essentially immediately either evaluated by thermogravimetric analysis (TGA) or used to prepare a cured joined structure.
Method 2: Ambient
A cured polymeric composite article was stored at ambient conditions, approximately 72° F. (22° C.) and 50% Relative Humidity (RH), for 21 days, after which it was essentially immediately evaluated by TGA.
Method 3: Wet
A cured polymeric composite article was conditioned in a temperature/humidity chamber at 160° F. (71° C.) and 100% RH for 9 days, then allowed to cool on a benchtop to room temperature for approximately 30 minutes, after which it was essentially immediately either evaluated by TGA or used to prepare a cured joined structure.

| | Materials |
|---|---|
| DER 332 | A liquid bisphenol A-based polyepoxide resin having an epoxide equivalent weight of from 171 to 175 grams/equivalent, available as DER ™ 332 resin from Dow Chemical Company, Midland, Michigan. |
| EPON 828 | A liquid bisphenol A-based polyepoxide resin having an epoxide equivalent weight of from 185 to 192 grams/equivalent, available as EPON ™ 828 resin from Resolution Performance Products, Houston, Texas. |
| EPON SU-2.5 | A liquid bisphenol A-based novolac polyepoxide resin having an average epoxide group functionality of about 2.5, available as EPON ™ SU-2.5 resin from Resolution Performance Products, Houston, Texas. |
| EPON SU-8 | A solid bisphenol A-based novolac polyepoxide resin having an average epoxide group functionality of about 8, available as EPON ™ SU-8 resin from Resolution Performance Products, Houston, Texas. |
| EPON 1004F | A medium molecular weight bisphenol A-based polyepoxide resin having an epoxide equivalent weight of from 800 to 950 grams/equivalent, available as EPON ™ 1004F resin from Resolution Performance Products, Houston, Texas. |
| EPON 1009F | A very high molecular weight solid bisphenol A-based polyepoxide resin having an epoxide equivalent weight of from 2300 to 3800 grams/equivalent and a melting point of between 130 and 140° C., available as EPON ™ 1009F resin from Resolution Performance Products, Houston, Texas. |
| TACTIX 756 | A dicyclopentadiene-based polyepoxide resin, having an epoxide equivalent weight of from 245 to 265 grams/equivalent, available as TACTIX ™ 756 resin from Huntsman Advanced Materials Americas, Incorporated, Brewster, New York. |
| CG 1400 | Dicyandiamide (1-cyanoguanidine)), available as Amicure ™ CG-1400 from Air Products and Chemicals, Incorporated, Allentown, Pennsylvania. |
| OMICURE U52 | An aromatic substituted urea (4,4'-methylene-bis(phenyl dimethyl urea), available as OMICURE ™ U52 from CVC Specialty Chemicals Incorporated, Moorestown, New Jersey. |
| DEH 85 | An unmodified phenolic hardener having an active hydrogen equivalent weight of from 250 to 280 grams/equivalent, available as DEH ™ 85 Epoxy Curing Agent from Dow Chemical Company, Midland, Michigan. |
| IPDH | Isophthaloyldihydrazide, having an amine equivalent weight of 49.2 grams/equivalent. |
| o-TBAF | 9,9-bis(3-methyl-4-aminophenyl)fluorene, having a theoretical amine hydrogen equivalent weight of 94.5 grams/equivalent. |
| EXL-2691A | A core/shell impact modifier having a crosslinked poly(butadiene/styrene) core with a grafted poly(methyl methacrylate) shell, available in powder form as PARALOID EXL ™-2691A from Rohm and Haas, Philadelphia, Pennsylvania. |
| DUOMOD 5047 | A carboxyl-functional elastomeric powder having a target average particle size of 50 micrometers and a target glass transition temperature of approximately 19° C. (obtained as DuoMod ™ 5047 toughener from Zeon Chemicals L.P., Louisville, Kentucky). |
| DUOMOD 5097 | An epoxy-functional elastomeric powder supplied in a fine agglomerate form with at least 99 percent of the agglomerate particles having a size of less than 105 micrometers, and with a target individual particle size of 0.3 micrometers (obtained as DuoMod ™ 5097 toughener from Zeon Chemicals L.P., Louisville, Kentucky). |

-continued

| Materials | |
|---|---|
| BOLTORN E1 | An epoxy-functional, dendritic, viscous liquid (at room temperature) polymer having a highly branched aliphatic polyester backbone, a molecular weight of approximately 10,500 grams/mole, an epoxy equivalent weight of approximately 850 to 900 grams/equivalent, and an average of 11 reactive epoxide groups per molecule, available as BOLTORN ™ E1 polymer, an experimental material, from Perstorp Specialty Chemicals AB, Sweden. |
| Rubber Toughener | Diprimary amine endcapped poly(tetramethylene oxide), having a number average molecular weight of about 7500. |
| CTBN #1 | A liquid, carboxyl-terminated butadiene/nitrile rubber polymer, having a molecular weight of about 3800, a glass transition temperature of −66° C., and a carboxyl content of 28 (acid number), available as HYCAR ™ CTBN 1300x31 from Noveon, Incorporated, Cleveland, Ohio. |
| CTBN #2 | A liquid, carboxyl-terminated butadiene/nitrile rubber polymer, having a molecular weight of about 3150, a glass transition temperature of −30° C., and a carboxyl content of 32 (acid number), available as HYCAR ™ CTBN 1300x13 from Noveon, Incorporated, Cleveland, Ohio. |
| VTBN | A liquid, vinyl-terminated butadiene/nitrile rubber polymer, having a Brookfield viscosity of 425,000 mPa-sec at 27° C. and a glass transition temperature of −45° C., available as HYCAR ™ VTBN 1300x43 from Noveon, Incorporated, Cleveland, Ohio. |
| P1800 | A powdered grade of polysulfone thermoplastic polymer having a glass transition temperature of 185° C., available as UDEL ™ P1800 from Solvay Advanced Polymers, LLC, Alpharetta, Georgia. |
| TWARON Aramid Pulp | TWARON ™ 2091 aramid microfibers (poly-(paraphenylene terephthalamide)), having a linear molecular skeleton structure, available in pulp form from TEIJIN TWARON BV, The Netherlands. |
| AF-163-2M | 3M ™ Scotch-Weld ™ Structural Adhesive Film having a non-woven supporting carrier, based on a modified thermosetting epoxy structural adhesive designed for curing at temperatures of 225° F. (107° C.) to 300° F. (149° C.), available from 3M Company, St. Paul, Minnesota. |
| AF-3109-2K | 3M ™ Scotch-Weld ™ Structural Adhesive Film having a knit scrim support, based on a nonvolatile, modified thermosetting epoxy structural adhesive designed for curing at temperatures of 225° F. (107° C.) to 350° F. (177° C.) and having an areal weight of 0.80 to 0.90 pounds/square foot (390 to 439 grams/square meter), available from 3M Company, St. Paul, Minnesota. |
| AF-191 | 3M ™ Scotch-Weld ™ Structural Adhesive Film; an unsupported, thermosetting, nonvolatile, modified epoxy film adhesive designed for curing at a temperature of 350° F. (177° C.) and having an areal weight of 0.05 pounds/square foot (244 grams/square meter)), available from 3M Company, St. Paul, Minnesota. |
| AF-325 | 3M ™ Scotch-Weld ™ Low Density Composite Surfacing Film; a non-woven polyester supported, low volatility, thermosetting epoxy film for composite surfacing, designed for curing at temperatures of 250° F. (121° C.) to 350° F. (177° C.) and having an areal weight of between 147 and 195 grams/square meter, available from 3M Company, St. Paul, Minnesota. |

Preparation of Curable Resin Compositions

Two different preblends of polyepoxide resin and flow modifier were provided and used to prepare curable resin compositions:

Preblend #1: 92.4 grams of EPON 1004F was placed into a 150 milliliter reactor and heated to approximately 230° F. (110° C.) using a paddle blade at approximately 200 revolutions per minute (rpm) for constant agitation until the polyepoxide resin was essentially completely melted. Then 7.6 grams of TWARON™ 2091 aramid fiber flow modifier was added to the polyepoxide resin and mixed for 15 minutes. The dispersion that was obtained was removed from the reactor and placed on a silicone-treated release liner and allowed to cool to room temperature for approximately 3 hours. The resulting solid material was then ground using a micro-pulverizing type hammer mill having a 0.38 inch (9.5 millimeters) diameter screen. The maximum particle size was 0.38 inch (9.5 millimeters) in diameter. The majority of the particles had a significantly smaller diameter.

Preblend #2: 150 grams of EPON 828 was placed into a 250 milliliter reactor and heated to approximately 200° F. (93° C.) using a paddle blade at approximately 200 rpm for constant agitation. Next, 30 grams of P1800 polysulfone resin flow modifier was slowly added to the polyepoxide resin. The temperature was then increased to approximately 350° F. (177° C.) and the agitation speed reduced to approximately 150 rpm. The dispersion was heated and agitated under these conditions until it became a substantially homogeneous mixture. This mixture was allowed to cool to room temperature to provide a viscous, yellow-colored, transparent liquid.

Polyepoxide resins and the above-described preblends were charged into a 200 gram capacity plastic container in the appropriate ratios to provide the amounts shown for the various Examples in Table 1 below. The container was heated for about 15 minutes in a forced air oven set at 150° C., after which it was removed and placed in a planetary-type mixer (SPEED MIXER™, Model DA 400 FV, available from Synergy Devices Limited, Buckinghamshire, United Kingdom) set at a speed of 2750 rpm for 1 minute. The container and its contents were then returned to the oven and equilibrated at about 120° C. for between 15 and 20 minutes. Next, a toughening modifier was added to this blend, and it was mixed as described above, after which the container was removed from the planetary mixer and allowed to cool below 100° C. The curing agents were then added, and the blend was again mixed as described above. After removal from the mixer, the inside wall of the container was scraped down, followed by putting the container back into the mixer for another cycle. The curable resin composition obtained was used essentially immediately to prepare a curable, liner-supported adhesive film.

Preparation of Curable, Liner-Supported Adhesive Films

The heated composition (having a temperature of about 90° C. (194° F.)) from the "Preparation of Curable Resin Compositions" procedure above was coated between two 0.005 inch (0.13 millimeters) thick paper liners, each having a silicone coating on one side and a polyethylene coating on the opposite side, such that the curable resin composition contacted the silicone-coated side of each liner. This was done using a knife-over-bed coating station having a gap setting of 0.008 inches (0.20 millimeters) greater than the total combined release liner thickness and a bed and knife temperature of 194° F. (90° C.). A liner-supported, curable adhesive film was obtained as a liner/curable adhesive film/liner sandwich, which was stored for 24 hours at room temperature (about 72° F. (22° C.)), and then stored at −20° F. (−29° C.) until it was used to prepare curable, nylon fabric-supported adhesive films.

Preparation of Curable, Nylon Fabric-Supported Adhesive Films

A sample of a liner/curable adhesive film/liner sandwich was equilibrated at room temperature prior to use. The liner from one side of the sandwich, measuring about 11.5 inches (29.2 centimeters) long and about 6 inches (15.2 centimeters) wide, was removed, and a supporting, nonwoven nylon fabric (available as Cerex™ 23 fabric, with a round filament geometry, from Cerex Advanced Fabrics. L.P., Cantonment, Fla.) having an areal weight of 0.4 ounces/square yard (13.6 grams/square meter), which had been corona treated on both sides, was placed on the exposed adhesive surface. This fabric was slightly larger in size than the sandwich. The liner was replaced over the nonwoven nylon fabric, and the resulting lay-up was passed between two rubber-coated, heated nip rollers at a temperature of approximately 140° F. (60° C.). The position of the upper roller and its contact pressure with the lower drive roller was controlled by air pressurized pistons having an air supply pressure of about 20 psi (137.9 kPa). A curable adhesive film having a nonwoven nylon fabric embedded therein, and having a release liner on each side, was obtained. Curable, nylon fabric-supported adhesive films prepared in this manner were subsequently used in the Examples described below.

Cured Polymeric Composite Articles

Cured, unidirectional carbon fiber reinforced polymeric composite articles were provided in two different manners. In the first manner (hereinafter, designated "Source 1"), carbon fiber prepreg material was obtained and cured into unidirectional carbon fiber reinforced polymeric composite articles as next described. More specifically, ten plies of carbon fiber prepreg (available as "Toray 3900-2/T800S", having an areal weight of 190 grams/meter$^2$ and a resin content of 35%, from Toray Carbon Fibers America, Incorporated, Decatur, Ala.) measuring 8 inches by 6 inches (20.3 centimeters by 15.2 centimeters), were laid up unidirectionally, and a layer of "Polyester Release Peel-Ply Fabric" protective material (Style 56009, Code 60001, having an areal weight of 2.5 ounces/square yard (8.5 grams/square meter) and a nominal thickness of 0.0055 inches (0.140 millimeters), available from Precision Fabrics Group, Incorporated, Greensboro, N.C.) was positioned on the upper outer major surface of the resulting construction. The "Polyester Release Peel-Ply Fabric" protective material is hereinafter referred to as "Peel-Ply". This layup was placed in a vacuum bag, which was then positioned in an autoclave. A partial vacuum of about 1.9 inches (48.3 mm) Hg was applied at room temperature (approximately 72° F. (22° C.)) for 10 to 15 minutes, after which the external pressure was gradually increased to 85 psi (586 kPa). The vacuum bag was then vented to release the vacuum, and the temperature was raised at 5° F./minute (2.8° C./minute) up to 350° F. (177° C.) and held there for 2 hours. The cured polymeric composite article with "Peel-Ply" on one surface was then cooled at 10° F./minute (5.5° C./minute) to room temperature, at which point the pressure was released, and the cured article having an approximate thickness (not including the "Peel-Ply" layer) of 0.075 inches (1.9 millimeters) was removed from the autoclave and vacuum bag.

In the second manner (hereinafter, designated "Source 2"), cured polymeric composite articles measuring approximately 12 inches by 6 inches by 0.075 inches (30.5 centimeters by 15.2 centimeters by 1.9 millimeters) were obtained. These cured composite articles had been prepared using both the prepreg material and essentially the same procedure as described above. The cured articles had a layer of "Peel-Ply" protective material on one of their two major outer surfaces. The thickness of these articles was measured without the "Peel-Ply" in place.

Preparation of Cured Joined Structures

Cured joined structures, prepared from the above-described curable nylon fabric-supported adhesive film and two of the above-described cured polymeric composite articles, were provided for evaluation of overlap shear strength. More specifically, two cured polymeric composite articles measuring 6 inches by 12 inches (15.2 centimeters by 30.5 centimeters), or 6 inches by 8 inches (15.2 centimeters by 20.3 centimeters) were conditioned in one of the ways described above in "Environmental Conditioning". The "Peel-Ply" protective material was then removed from the conditioned articles. After removing the protective liner from one side of the curable nylon fabric-supported adhesive film, the film was applied to the entire surface of a conditioned article, from which the "Peel-Ply" had been removed, by hand using a small rubber roller in such a manner as to exclude entrapped air and ensure intimate contact between the exposed adhesive and the article. After removing the second liner from the curable adhesive film (and the "Peel-Ply" from a second cured polymeric composite article), the newly exposed surface of the second composite article was placed in contact with the exposed adhesive surface to give a sandwich assembly with a cured polymeric composite article on each side of the curable adhesive film, the articles and film all having the same length and width dimensions.

Next, the resulting assembly was fastened together using a pressure-sensitive adhesive tape at each end and then placed on a vacuum table for 15 minutes at full vacuum. The assembly was then cured in an autoclave in the following manner. After applying a vacuum to reduce the pressure to about 1.9 inches (48.3 mm) Hg, an external pressure of about 45 psi (310 kPa) was applied, and the temperature of the autoclave was heated from about room temperature (72° F. (22° C.)) to either 250° F. (121° C.) or 350° F. (177° C.), depending on the particular adhesive film employed, at a rate of 4.5° F./minute (2.5° C./minute). The vacuum was released when the pressure reached about 15 psi (103.4 kPa). The final temperature and pressure were maintained for 120 minutes before cooling to room temperature at a rate of 5° F./minute (2.8° C./minute), at which point the pressure was released and a cured joined structure was obtained.

Cured Composite Article with a Surfacing Layer

An aluminum panel surface was polished with fine steel wool, then cleaned with methyl ethyl ketone (MEK). Masking tape was applied to the outer edges of the panel surface, and the panel surface was then wiped with release agent Loctite™ Frekote™ 700-NC Mold Release Agent (a water-based release agent available from Loctite Corporation, Rocky Hill, Conn.), which was allowed to air dry after which the masking tape was removed. The resulting release coating was then cured at 250° F. for 30-60 min. After cooling to room temperature, the panel surface was polished with a lint free cloth (Kimwipes™ EX-L, available from Kimberly-Clark Corporation, Rosswell, Ga.). Next, after removal of the paper liner from one side, a curable nylon fabric-supported adhesive film measuring approximately 8 inches by 6 inches (20.3 centimeters by 15.2 centimeters) was positioned such that its newly exposed surface contacted the polished panel inside the edges that had been masked off. The adhesive film was rolled down using a rubber roller. Paper liner was removed from the second, upper side of the adhesive film, and a cured composite article, measuring approximately 8 inches by 6 inches (20.3 centimeters by 15.2 centimeters), was placed on the exposed, top surface of the adhesive film. This assembly was then placed on a vacuum table for 15 minutes at full vacuum. Next, the assembly was positioned in a vacuum bag and cured in an autoclave in the following manner. After applying a vacuum to reduce the pressure to about 1.9 inches (48.3 mm) Hg, an external pressure about 45 psi (310 kPa) was applied, and the temperature of the autoclave was heated from about room temperature (72° F. (22° C.)) to either 250° F. (121° C.) or 350° F. (177° C.), depending upon the particular adhesive film employed, at a rate of 4.5° F./minute (2.5° C./minute). The vacuum was released when the pressure reached about 15 psi (103.4 kPa). The final temperature and pressure were maintained for 120 minutes before cooling to room temperature at a rate of 5° F./minute (2.8° C./minute), at which point the pressure was released and, upon removal from the aluminum panel, a cured composite article having a surfacing layer on one side was obtained. The cured composite article with surfacing layer was evaluated visually by eye for general appearance (for example, as to uniformity and surface smoothness) and pin holes (for example, as to quantity and size). A value of 1 (worst) to 10 (best) was assigned for each characteristic for each article evaluated.

Cured Composite Article with Lightning Protection System

An aluminum panel surface was polished with fine steel wool, cleaned with methyl ethyl ketone (MEK), then polished with a lint-free cloth (Kimwipes™ EX-L, available from Kimberly-Clark Corporation, Rosswell, Ga.). A gray fluoropolymer film, having both surfaces etched, was provided by coextruding a uniform mixture of pellets having 97 percent (by weight) clear DYNEON™ THV 500 (a tetrafluoroethylene-hexafluoropropylene-vinylidene fluoride terpolymer, available from Dyneon (a wholly owned subsidiary of 3M Company), Oakdale, Minn.) and 3 percent (by weight) of gray pigmented DYNEON™ THV 200 as described in U.S. Pat. No. 6,475,616 (Dietz et al.), Example 1. A solvent-based acrylic pressure sensitive adhesive was applied to one side of the fluoropolymer film and dried to give a 0.0003 inch (about 0.008 millimeters) thick adhesive layer. Next, an aluminum mesh (Part No. 1.5AL6-075F, having areal weight of 0.0075 pounds/square foot (36.6 grams/square meter) and an overall thickness of 0.0015 inches (0.038 millimeters), available from Dexmet Corporation, Naugatuck, Conn.) was laminated, at room temperature, onto the acrylic adhesive surface. A second layer of the solvent-based acrylic pressure sensitive adhesive was applied on top of the aluminum mesh and dried to give a fluoropolymer film having a pressure sensitive acrylic adhesive layer with an embedded aluminum mesh on one side. The total adhesive layer thickness, including the mesh, was about 0.003 inches (0.08 millimeters). A low density polyethylene (LDPE) protective liner was placed over the adhesive layer.

The resulting coated fluoropolymer film was positioned on the aluminum panel with the protective liner layer facing outward. Next, the protective liner was removed to expose the acrylic adhesive surface, and the first protective liner from one side of a 350° F. (177°) curable, nylon fabric-supported adhesive film was removed to expose one surface of the curable adhesive film. The two exposed surfaces were brought into contact with each other and the combined structure was rubbed down by hand to remove any wrinkles and ensure intimate contact between the acrylic adhesive layer and the curable adhesive film. The second protective liner was removed from the top side of the curable, nylon fabric-supported adhesive film and, after removal of their respective protective liners, two plies of fiberglass prepreg material (Part No. PP500H, available from Critical Materials Incorporated, Poulsbo, Wash.) were placed on the exposed curable adhesive surface. A second sheet of curable, nylon fabric-supported adhesive film was provided and, after removal of the protective liner from one side of it, the exposed surface of this second sheet was applied by hand to the second outer, exposed surface of prepreg material and rubbed down by hand as described above. Next, after removal of the second protective liner from the second curable, nylon fabric-supported adhesive film, the exposed surface of the adhesive film was brought into contact with a glass fabric reinforced honeycomb structure impregnated with phenolic resin (HexWeb™ HRP-3/16-8.0, available from Hexcel Corporation, Stamford, Conn.). After removal of the appropriate protective liners, another layer of curable, nylon matte-supported adhesive film was applied to the opposite side of the honeycomb structure and an additional two plies of fiberglass prepreg were positioned on the outside surface of this curable adhesive film. Finally, a layer of "Peel Ply" was placed on the outer, exposed prepreg surface.

This entire assembly was then placed on a vacuum table for 5-10 minutes at full vacuum for compaction. The compacted assembly was then positioned in a vacuum bag and cured in an autoclave in the following manner. After applying a vacuum to reduce the pressure to about 1.9 inches (48.3 mm) Hg, an external pressure of about 45 psi (310 kPa) was applied, and the temperature of the autoclave was heated from about room temperature (72° F. (22° C.)) to 350° F. (177° C.) at a rate of 4.5° F./minute (2.5° C./minute). The vacuum was released when the pressure reached about 15 psi (103.4 kPa). The final temperature and pressure were maintained for 120 minutes before cooling to room temperature at a rate of 5° F./minute (2.8° C./minute), at which point the pressure was released and a cured composite article having a lightning protection system was obtained.

Examples 1-3 and Comparative Examples 1-9

Examples 1-3 and Comparative Examples (CE) 1-9 in Tables 1, 3, and 4 below demonstrate the effect of various toughening modifiers in joining environmentally conditioned cured polymeric composite articles together to provide cured joined structures. The amounts are given in parts by weight (pbw), wherein the combined amounts of all components is between 99 and 102 pbw.

Example 1 and Comparative Example 1 were prepared as described in "Preparation of Cured Joined Structures" above using a 250° F. (121° C.) cure cycle and then evaluated at 200° F. (93° C.) for overlap shear strength (OLS). Examples 2 and 3, and Comparative Examples 2-9, were prepared as described in "Preparation of Cured Joined Structures" above using a 350° F. (177° C.) cure cycle and then evaluated at 277° F. (136° C.) for overlap shear strength.

Moisture Content of Cured Polymeric Composite Articles

Cured polymeric composite articles were provided in the two ways described previously. After environmental conditioning, they were evaluated as described in the test method "Weight Loss." The designations "Dry", "Ambient" and "Wet" in the tables refer to the environmental conditions to which the cured polymeric composite articles were exposed. The results are shown in Table 2 below.

TABLE 2

| Cured Polymeric | % Weight Loss | | |
|---|---|---|---|
| Composite Article | Dry | Ambient | Wet |
| Source 1 | 0.377 | Not Determined | 1.334 |
| Source 2 | 0.267 | 0.508 | 1.101 |
| Average | 0.322 | 0.508 | 1.218 |

Overlap Shear Strength (OLS) of Cured Joined Structures

Environmentally conditioned cured polymeric composite articles were bonded together using the adhesive films of Examples 1-3 and Comparative Examples 1-9 to provide cured joined structures which were then evaluated for over-

TABLE 1

| | Formulations | | | | | | | | | | | |
|---|---|---|---|---|---|---|---|---|---|---|---|---|
| Component | Ex. 1 | Ex. 2 | Ex. 3 | CE 1 | CE 2 | CE 3 | CE 4 | CE 5 | CE 6 | CE 7 | CE 8 | CE 9 |
| EPON 828 | 35.0 | 15.0 | 15.7 | AF-163-2 | 11.0 | 15.0 | 15.0 | 15.0 | 15.0 | 15.0 | 15.0 | AF-3109-2 |
| DER 332 | 10.3 | | 5.85 | | 2.0 | | | | | | | |
| EPON 1004F | 13.7 | 10.0 | | | | 10.0 | 10.0 | 10.0 | | | | |
| EPON 1009F | | | | | | | | | 10.0 | 10.0 | 10.0 | |
| EPON SU-2.5 | | 25.0 | | | | 25.0 | 25.0 | 25.0 | 25.0 | 25.0 | 25.0 | |
| EPON SU-8 | | | 5.12 | | 13.2 | | | | | | | |
| TACTIX 756 | | 25.0 | 25.1 | | 26.4 | 25.0 | 25.0 | 25.0 | 25.0 | 25.0 | 25.0 | |
| CG 1400 | 3.9 | 4.04 | 0.093 | | 0.092 | 4.04 | 4.04 | 4.04 | 3.93 | 3.93 | 3.93 | |
| OMICURE U52 | 2.1 | | | | | | | | | | | |
| DEH 85 | 18.5 | | | | | | | | | | | |
| IPDH | | 4.73 | | | | 4.73 | 4.73 | 4.73 | 4.61 | 4.61 | 4.61 | |
| o-TBAF | | | 34.0 | | 33.4 | | | | | | | |
| EXL 2691A | 14.9 | 15.0 | 15.7 | 3.0 | | | | | | | | |
| DUOMOD 5097 | | | | | | 15.0 | | | | | | |
| DUOMOD 5047 | | | | | | | 15.0 | | | | | |
| BOLTORN E1 | | | | | | | | 15.0 | | | | |
| Rubber Toughener | | | | | 8.6 | | | | | | | |
| CTBN #1 | | | | | | | | | 15.0 | | | |
| CTBN #2 | | | | | | | | | | 15.0 | | |
| VTBN | | | | | | | | | | | 15.0 | |
| P1800 | | 3.0 | 1.37 | | 1.38 | 3.0 | 3.0 | 3.0 | 3.0 | 3.0 | 3.0 | |
| TWARON Aramid Pulp | 1.6 | | | | | | | | | | | | lap shear strength (OLS). The designations "Dry" and "Wet" in the tables refer to the environmental conditions to which the cured polymeric composite articles were exposed just prior to bonding with the adhesive films. % Retention was calculated as [OLS (Wet)/OLS (Dry)]×100.

TABLE 3

| Example No. | OLS (psi) [MPa] | | % Retention |
|---|---|---|---|
| | Dry | Wet | |
| Ex. 1 | 2100 [14.5] | 1032 [7.1] | 49 |
| CE 1 | 3365 [23.2] | 531 [3.7] | 16 |

TABLE 4

| Example No. | OLS (psi) [MPa] | | % Retention |
|---|---|---|---|
| | Dry | Wet | |
| 2 | 3448 [23.8] | 2113 [14.6] | 61 |
| 3 | 3603 [24.8] | 2441 [16.8] | 68 |
| CE 2 | 3791 [26.1] | 956 [6.6] | 25 |
| CE 3 | 3536 [24.4] | 1668 [11.5] | 47 |
| CE 4 | 3688 [25.4] | 866 [6.0] | 23 |
| CE 5 | 1829* [12.6] | 1009* [7.0] | 55* |
| CE 6 | 1560 [10.8] | 350 [2.4] | 22 |
| CE 7 | 2398 [16.5] | 672 [4.6] | 28 |
| CE 8 | 1790 [12.3] | 200 [1.4] | 11 |
| CE 9 | 1590 [11.0] | 173 [1.2] | 11 |

*For CE 5, the resin composition, adhesive film, and cured joined structure appeared to exhibit gross phase separation of the toughening modifier, a feature that can compromise overlap shear strength performance. As a result, the dry OLS value may be low, leading to an artificially high retention value.

Examples 4 and 5 and Comparative Examples 10 and 11

Adhesive films were used to prepare cured composite articles having a cured surfacing layer thereon, which were then evaluated for general appearance and pin holes, all as described in "Cured Composite Article with a Surfacing Layer" above. The results are shown in Table 5 below. AF-325 (CE 11) is an epoxy adhesive film sold specifically as a composite surfacing film. AF-191 (CE 10) is a commercially available adhesive film often used for this same purpose.

TABLE 5

| Example No. | Adhesive System | General Appearance | Pin Holes |
|---|---|---|---|
| CE 10 | AF-191 | 9 | 10 |
| CE 11 | AF-325 | 8 | 9 |
| 4 | Example 1 | 7 | 5 |
| 5 | Example 2 | 9 | 8 |

Example 6

The adhesive film of Example 2 above was used to prepare a cured composite article having an embedded aluminum mesh therein. Such a construction has utility as a means of providing lightning strike protection. The article was prepared as described in "Cured Composite Article with Lightning Protection" above. The resulting cured composite article had a surface that was essentially smooth and had no visible defects, such as pinholes.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A method comprising
   (a) providing a first cured polymeric composite article;
   wherein the first cured polymeric composite article comprises continuous reinforcing fibers in the form of a unidirectional array of individual continuous fibers, a woven fabric, a knitted fabric, a yarn, a roving, or a braided construction;
   (b) providing a curable composition on a liner, wherein the curable composition comprises
      (1) at least one thermosetting resin, and
      (2) at least one preformed, substantially non-functional, particulate core-shell polymer modifier comprising at least one elastomer;
   wherein the curable composition contains no liquid butadiene/nitrile rubber polymer;
   wherein the curable composition is a solid adhesive film;
   wherein the particulate core-shell polymer modifier has a crosslinked poly(butadiene/styrene) core with a poly(methyl methacrylate) shell;
   (c) removing the liner from the curable composition,
   (d) directly or indirectly applying said composition as a solid film to at least a portion of at least one surface of said first cured polymeric composite article, and
   (e) joining the first cured polymeric composite article to an adherend by means of the curable composition;
   wherein at least one of the first cured polymeric composite article or the adherend is wet,
   wherein the curable composition comprises:
      bisphenol A-based polyepoxide,
      a polysulfone thermoplastic polymer flow modifier or an aramid fiber flow modifier,
      dicyandiamide (1-cyanoguanidine),
      a dicyclopentadiene-based polyepoxide, and
      isophthaloyldihydrazide.

2. The method of claim 1, wherein said modifier is in the form of microparticles.

3. The method of claim 1, wherein said modifier is included in said curable composition in a concentration of about 2 to about 30 weight percent, based upon the total weight of said curable composition.

4. The method of claim 1, wherein the step of joining the first cured polymeric composite article to the adherend comprises bringing at least a portion of at least one surface of the article and a surface of the adherend into contact with said composition in a manner such that said composition becomes sandwiched between said article and said adherend.

5. The method of claim 4, wherein said adherend comprises at least one of a polymeric composite article, a protective article, a paint replacement system, and a lightning protection system.

6. The method of claim 5, wherein said paint replacement system comprises a paint replacement applique and said lightning protection system comprises a lightning protection applique.

7. The method of claim 1, wherein said method further comprises at least partially curing the composition.

8. The method of claim 1, wherein said film comprises an embedded scrim.

9. The method of claim 1, wherein the curable composition comprises polysulfone resin flow modifier.

10. The method of claim 1, wherein the curable composition comprises aramid fiber flow modifier.

* * * * *